US007031733B2

United States Patent
Alminana et al.

(10) Patent No.: US 7,031,733 B2
(45) Date of Patent: Apr. 18, 2006

(54) ONLINE SHORT MESSAGE SERVICE (SMS) MONITORING TOOL

(75) Inventors: Emilio Alminana, Boca Raton, FL (US); Raymond Jong-A-Kiem, Davie, FL (US)

(73) Assignee: Siemens Communications, Inc., Boca Raton, FL (US)

( * ) Notice: Subject to any disclaimer, the term of this patent is extended or adjusted under 35 U.S.C. 154(b) by 385 days.

(21) Appl. No.: 10/280,502

(22) Filed: Oct. 25, 2002

(65) Prior Publication Data

US 2004/0082347 A1 Apr. 29, 2004

(51) Int. Cl.
*H04Q 7/20* (2006.01)

(52) U.S. Cl. .................. 455/466; 455/418; 455/419; 455/420; 455/422.1; 455/424; 455/67.11

(58) Field of Classification Search ............... 455/466, 455/418, 419, 420, 412.1, 422.1, 423, 424, 455/67.11

See application file for complete search history.

(56) References Cited

U.S. PATENT DOCUMENTS

| 5,794,142 | A  | * | 8/1998 | Vanttila et al. ............. 455/419 |
| 6,230,027 | B1 | * | 5/2001 | Habib ........................ 455/566 |
| 6,301,484 | B1 | * | 10/2001 | Rogers et al. ............. 455/466 |
| 6,304,752 | B1 | * | 10/2001 | Rignell ....................... 455/403 |
| 6,374,102 | B1 | * | 4/2002 | Brachman et al. ....... 455/422.1 |
| 6,424,829 | B1 | * | 7/2002 | Kraft ....................... 455/412.1 |
| 6,801,781 | B1 | * | 10/2004 | Provost et al. ............. 455/466 |
| 2003/0003932 | A1 | * | 1/2003 | Corrigan et al. ........... 455/466 |
| 2004/0203615 | A1 | * | 10/2004 | Qu et al. ................. 455/412.1 |

* cited by examiner

*Primary Examiner*—Sonny Trinh
*Assistant Examiner*—Huy Phan

(57) ABSTRACT

A short message service (SMS) monitoring tool in a SMS-capable core node selectively monitoring SMS communications in a wireless communications system. SMS tool commands sent as SMS messages to the SMS monitoring tool enable/disable the SMS monitoring tool; start and stop monitoring; select mobile equipment (ME) for communications monitoring; and clear stored communications data. Collected SMS data include communications statistics and performance data.

12 Claims, 2 Drawing Sheets

ONLINE SHORT MESSAGE SERVICE (SMS) MONITORING TOOL

BACKGROUND OF THE INVENTION

1. Field of the Invention

The present invention is related to wireless communications monitoring and characterization and more particularly, to a tool for monitoring and characterizing short message service (SMS) quality.

2. Background Description

Today's wireless networks, which were designed mainly to carry voice traffic, can tolerate service problems such as patchy coverage and slow and tenuous connections, i.e., poor Quality of Service (QoS). Even a weak or patchy signal may still be understandable because, the human ear can still hear and understand the spoken word even in a very noisy environment. This is true even if there is a long pause between sending and receiving the voice communications signal.

However, these voice communications wireless networks are only marginally acceptable for data communications or data over wireless, e.g., Short Message Service (SMS) messages. SMS message technology is a standard feature in many second generation (2G) wireless networks, Global System for Mobile (GSM) communication devices. SMS also is standard in many third generation (3G) wireless networks, whether Time Division Multiple Access (TDMA), General Packet Radio Service (GPRS) or IS-95A Code Division Multiple Access (CDMA) based. Although, primarily a wireless application, Public Switched Telephone Networks (PSTN) are beginning to make SMS available for wireline networks also, because of its growing popularity.

However, to improve data over wireless, sources of these service problems must be identified and, as each new source or problem is identified, addressed. So, to identify a service problem, the wireless network service provider must monitor communications continuously, measuring delivery delay and failure rates, for example. The service provider can use these measurements to characterize, debug and improve network performance, identifying network bottlenecks and problem areas and, then, making appropriate adjustments or corrections.

Unfortunately, data needed to identify, characterize and understand network problems may be distributed throughout the network, making data collection a complicated and somewhat difficult task. Generally, most data collection and debugging tools require manual on-site intervention. A service representative must be there to activate the debugging tool, retrieve available data, make system adjustments and then, deactivate the debugging tool.

So, the typical service provider can only determine after the fact that a particular SMS message center was overloaded yesterday or a particular load balancer was underperforming last week, for example. Thus, the service provider cannot conduct real-time analysis, but must instead rely on old data to anticipate problems that might arise and initiate prospective corrective action for those problems that may or may not reoccur.

Thus, there is a need for data collection within a wireless communications system that facilitates collecting data in real time, identifying problems as they occur, selecting a response or corrective action, initiating the response, and monitoring the efficacy of the response.

SUMMARY OF THE INVENTION

It is a purpose of the invention to improve wireless data communications quality of service;

It is another purpose of the invention to facilitate short message service statistical and performance data collection;

It is yet another purpose of the invention to collect short message service statistical and performance data interactively, in real time and without requiring the on-site presence of service personnel.

The present invention relates to a short message service (SMS) monitoring tool. The tool is located in a SMS-capable core node and selectively monitoring SMS communications and collecting data in a wireless communications system. SMS tool commands sent as SMS messages to the SMS monitoring tool enable/disable the SMS monitoring tool; start and stop SMS communications monitoring; select mobile equipment (ME) for SMS communications monitoring; and clear stored SMS communications data. Collected communications SMS data include communications statistics and performance data.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
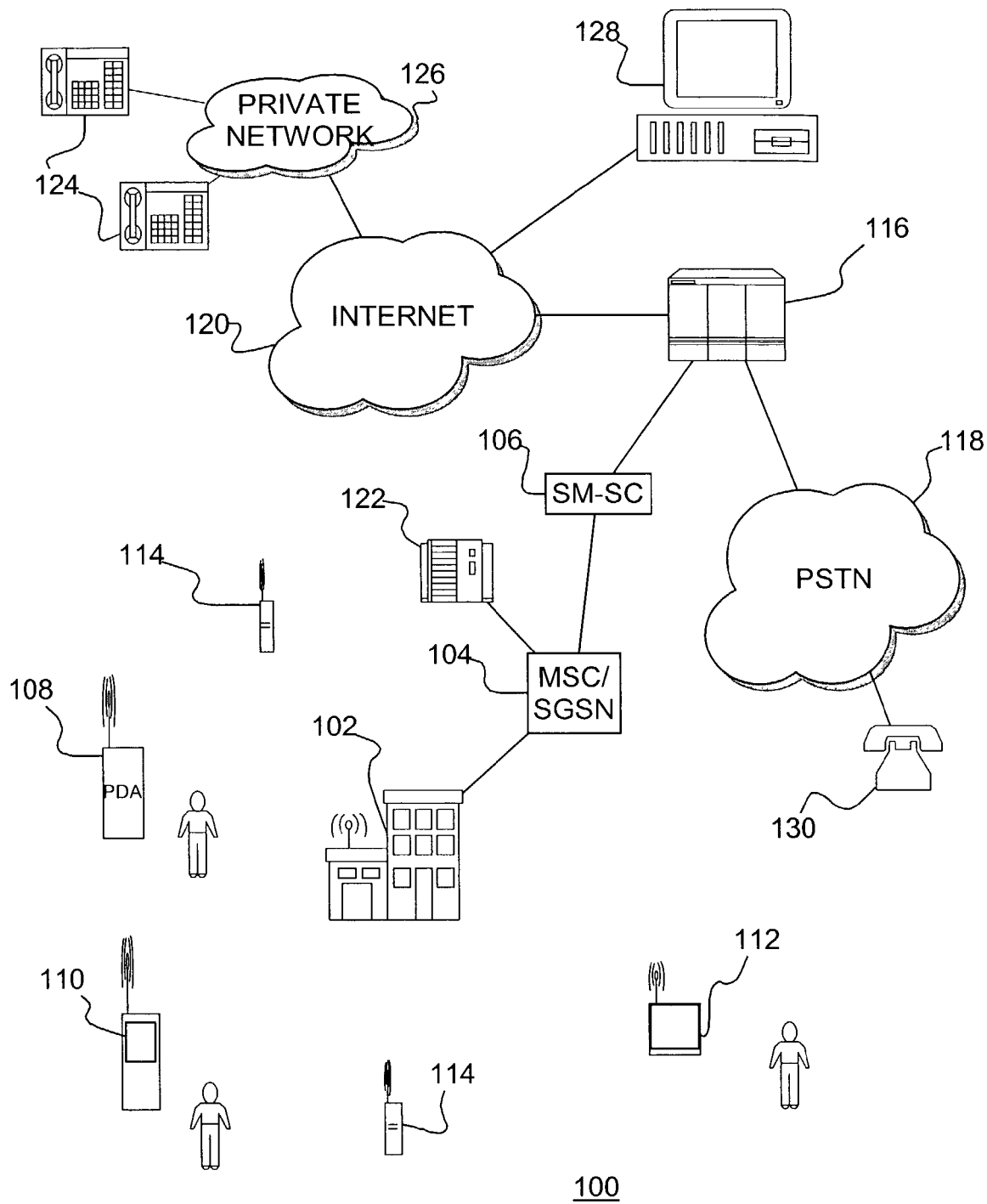
FIG. 1 shows an example of a Short Message Service (SMS) system 100 with a preferred embodiment online debugging tool according to the present invention.

Turning now to the drawings and more particularly FIG. 1 shows an example of a wireless data communications (e.g., Short Message Service (SMS)) system 100 with a preferred embodiment online debugging tool according to the present invention. A preferred core public wireless network or Public Land Mobile Network (PLMN) includes one or more local base stations 102 connected through a mobile switch node 104 to a Short Message Service Center (SMSC) 106. Further, the core network may include several mobile switch nodes 104, e.g., distributed to service different geographic locations. Mobile Equipment (ME) or wireless devices 108, 110, 112, 114 communicate wirelessly through local base stations 102 and may be any appropriate second generation (2G) or third generation (3G) wireless data (e.g., SMS) capable device.

Currently, there are two distinct approaches to upgrading 2G mobile networks to 3G networks. The first approach is a low risk approach, wherein 3G elements, e.g., Service for General Packet Radio Service (GPRS) Support Node (SGSN)/Gateway GPRS Support Node (GGSN) elements, are introduced into existing 2G networks to provide what is termed 2.5G capabilities, i.e. using packet-switching technology to achieve higher throughput, access to internet, etc. With newer technologies such as, Enhanced Data rates for GSM Evolution (EDGE or E-GPRS), higher throughput is achieved with circuit-switched networks simply by upgrading the Base Station Controllers (BSCs). The second approach is a higher risk 3G approach, i.e., introduce Universal Mobile Telecommunication System capable (UMTS-capable) nodes throughout the network. Thus, each mobile switch node 104 may be, for example, a 2G Mobile Switching Center (MSC) or, a 3G SGSN or a suitable equivalent thereof. Although the present invention is described in terms of 2G and 3G wireless communications, it is understood that this is for example only and not intended as a limitation.

Preferably, the core network accommodates connections to many different networks with gateways 116 into the conventional Public Switched Telephone Network (PSTN) 118, into the mobile radio network (e.g., base station 102 and ME 108, 110, 112, 114), and into the Internet 120. A preferred core network also includes at least one SMS-capable core network node (SMS core node) 122 selectively receiving SMS messages similarly to ME 108, 110, 112, 114. Although shown in this example as separate nodes, preferably, SMS core node 122 is implemented in an MSC/SGSN 104 and is configurable to respond to dedicated, unique Short Messages (SM) or SM tool commands. Thus, according to the present invention, SM tool commands are sent to one SMS core node 122 to initiate and control system monitoring, collecting statistical and performance network data in the SMS core node 122. Once collected, the data is passed from the SMS core node 122 to a selected destination for analysis. The destination may be a mobile subscriber, an e-mail address or any other suitable data collection destination.

As noted hereinabove, ME 108, 110, 112, 114 may include any small portable wireless data (e.g., SMS) capable device. Examples of suitable wireless devices include, for example, a Personal Digital Assistant (PDA) 108 with wireless connectivity, a cellular phone 110, or a wireless tablet/notebook computer 112. Each wireless device 108, 110, 112, 114 has memory allocated as local storage for storing short messages, e.g., in an inbox, in an outbox, in a drafts folder, and etc. Since, typically, this local storage or SMS memory is limited, ME 108, 110, 112, 114 provide a signal to the network that indicates either that SMS memory is available (SMS-MA) or its capacity has been exceeded.

In addition to wireless messaging (sending short messages between ME 108, 110, 112, 114 directly from mobile to mobile), SMS messages can be sent to ME 108, 110, 112, 114 from an operator service, from the Internet 120, or from a personal computer (PC) modem. Thus, communications devices 124 on a private network 126, a web surfer on an Internet enabled device 128, e.g., a PC with Internet access, and a SMS-enabled PSTN terminal 130 (e.g., a PC connecting with modem or, even a suitable equipped touch tone phone) have access to the core network.

The mobile switch node 104 provides interfaces to the base stations 102 connected to it and maintains a connection to a Visitor Location Register (VLR) core node (not shown), which is a location database to other mobile switching nodes 104 in the mobile network. Besides switching mobile phone connections, each mobile switch node 104 administers handovers to neighboring base stations (not shown), carries out call metering, provides comfort functions within the network and provides other subscriber services. The core network also includes one or more Home Location Register (HLR) core nodes (not shown) for storing subscriber data.

Figure 2:
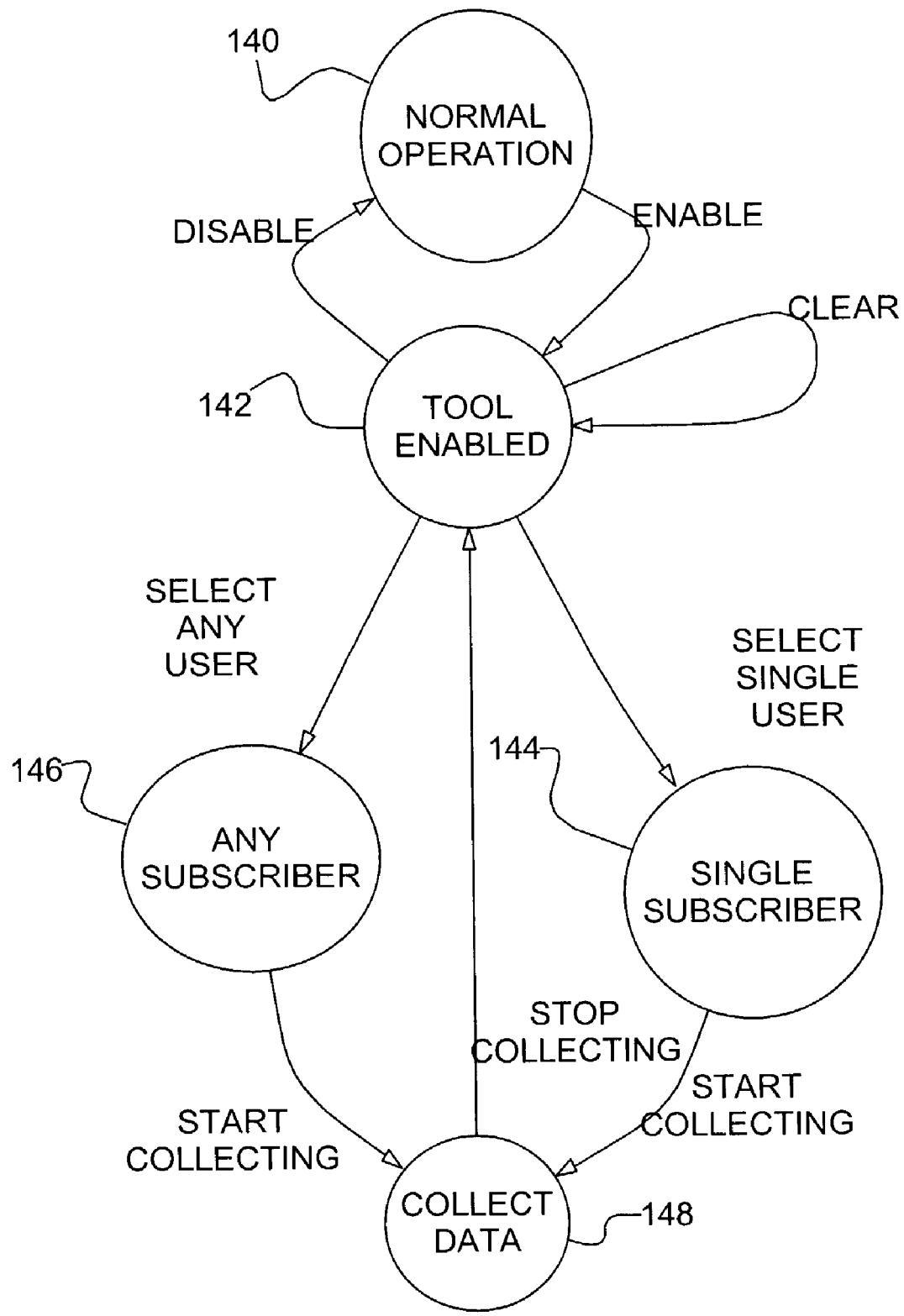
FIG. 2 shows an example of a state diagram for the online SMS debugging tool.

FIG. 2 shows an example of a state diagram for an online SMS debugging tool according to a preferred embodiment of the present invention. Initially, the tool is in disabled state 140. State changes are effected by a SM tool command to the online SMS debugging tool. Thus, the online SMS debugging tool is enabled by an SMS message with specific digit string that is recognized by the SMS core node (122 in FIG. 1) as an enable SM tool command, placing the SMS debugging tool in enabled state 142. Once enabled, a single subscriber can be selected for monitoring, placing the on-line SMS debugging tool in state 144, such that data is collected only for SMS messages sent from/to a specific subscriber. Otherwise, debugging can be selected such that data is collected on SMS messages sent from/to any subscriber, placing the on-line SMS debugging tool in state 146. A start SM tool command places the on-line debugging tool in state 148 to initiate statistical and performance data collection. A stop SM tool command terminates statistical and performance data collection, returning the tool to enabled state 142 or, optionally, to subscriber selected state 144 or 146. All statistical and performance data in the SMS core node can be cleared by a clear SM tool command while the on-line debugging tool is in enabled state 142.

Optionally, SM tool command may be included that invoke several "actions" simultaneously. For example, shortcut SM tool commands can be provided to enable+clear+report for a single subscriber or all subscribers, essentially, passing from state 140 through state 142 (where previously collected data is cleared) and state 144 or 146 to state 148. Also, provision may be made for clearing data in any or each of the other enabled states 144, 146, 148.

Thus, like any SMS message, a SM tool command to the SMS core node 122 in FIG. 1 may originate almost anywhere and in almost any country, both from within the mobile radio network and from without. SMS traffic in wireless data communications system 100 can be classified as mobile originating (MO) or mobile terminating (MT). A SMS message sent wirelessly from ME 108, 110, 112, 114 is a SMS Mobile-Originated (SMS-MO) delivery attempt. A SMS message sent to a mobile radio network device, e. g., ME 108, 110, 112, 114, is a SMS Mobile-Terminated (SMS-MT) delivery attempt. Examples of such MT messages include normal wireless messaging, as well as SMS messages sent over the Internet 120 from a remote land based station, e.g., from communications devices 124, Internet enabled device 128 or touch tone phone 130. Preferably, the online SMS debugging tool also collects data on ME memory availability. SMS traffic and memory availability data can be further classified by wireless communications genus (e. g., 2G or 3G) and by whether each attempted access completes or fails to complete. This traffic and memory availability data can be used to perform traffic studies in the particular SMS core node and can be used for SMS quality of service (QoS) assessments for the selected node(s).

So, for example, ME from another mobile radio network (not shown) can send a SMS-MO SM tool command to SMS core node 122 selecting ME 108, 110, 112, 114 and activating data collection there. A terminal 128 with access to the Internet 120 can send a SMS-MT message to ME 108, 110, 112, 114 which is logged by the online SMS debugging tool. SMS-MT messages may be sent over the Internet to the wireless service provider's website. Also, SMS-MT messages can be sent from the SMS-enabled PSTN terminal 130 to ME 108, 110, 112, 114.

Thus, the online SMS debugging tool monitors and collects SMS performance and statistical data in any SMS core node at any time for analysis and characterization of radio access failure types, whether for SMS-MO failures, SMS-MA failures, or SMS-MT failures. Statistical and performance data collection can be initiated, remotely, activating data collection within the Core Network node. This allows core network node developers to immediately collect and use this performance data to determine the exact cause of service problems, almost as soon as the problems are reported to the service provider's Technical Assistance Center (TAC). Especially since with worldwide SMS usage, short messages are easily sent across international boundaries, the present invention is very useful for collecting system information even from unmanned sites.

While the invention has been described in terms of preferred embodiments, those skilled in the art will recognize that the invention can be practiced with modification within the spirit and scope of the appended claims.

What is claimed is:

1. A short message service (SMS) monitoring tool in a SMS-capable core node of a wireless communications network, said SMS monitoring tool comprising:
    means for enabling and disabling said SMS monitoring tool responsive to first selected SMS messages;
    means for starting and stopping SMS communications monitoring responsive to second selected SMS messages; and
    means for storing collected SMS communications statistics and performance data responsive to third selected SMS messages.

2. A SMS monitoring tool as in claim 1 wherein said second selected SMS messages and third selected SMS messages are said first selected SMS messages.

3. A SMS monitoring tool as in claim 1 further comprising:
    means for clearing said SMS monitoring tool responsive to fourth selected SMS messages.

4. A SMS monitoring tool as in claim 3 wherein said means for enabling and disabling, said means for starting and stopping and said means for storing operate responsive to said fourth selected SMS messages.

5. A SMS monitoring tool as in claim 1 further comprising:
    means for selecting one of a plurality of SMS communications devices for monitoring by said SMS monitoring tool responsive to fourth selected SMS messages.

6. A SMS monitoring tool as in claim 5 wherein said means for enabling and disabling, said means for starting and stopping and said means for storing operate responsive to said fourth selected SMS messages.

7. A SMS monitoring tool as in claim 1 further comprising:
    means for selecting monitoring communications with a plurality of SMS communications devices by said SMS monitoring tool responsive to fourth selected SMS messages.

8. A SMS monitoring tool as in claim 7 wherein said means for enabling and disabling, said means for starting and stopping and said means for storing operate responsive to said fourth selected SMS messages.

9. A SMS monitoring tool as in claim 1, wherein SMS monitoring tool has a debug mode selectively enabled and disabled by respective ones of said first selected SMS messages and said second selected SMS messages.

10. A SMS monitoring tool as in claim 9, wherein said communications statistics and performance data is classified as originating from a selected wireless device, terminating in another wireless device or memory available at a terminating wireless device.

11. A SMS monitoring tool as in claim 1, wherein said SMS-capable core node is in a short message service center (SMSC).

12. A SMS monitoring tool as in claim 1, said SMS-capable core node is a service for general packet radio service (GPRS) support node (SGSN).

* * * * *